United States Patent [19]

Sasamori

[11] 4,097,146
[45] Jun. 27, 1978

[54] ORIGINAL HANDLING SYSTEM AND PROCESS

[75] Inventor: Yusuke Sasamori, Ebina, Japan

[73] Assignee: Rank Xerox, Ltd., London, England

[21] Appl. No.: 745,516

[22] Filed: Nov. 26, 1976

[30] Foreign Application Priority Data

Dec. 18, 1975 Japan .................................. 50-170021

[51] Int. Cl.² .......................... G03B 27/62; B65H 9/04
[52] U.S. Cl. ....................................... 355/75; 271/245
[58] Field of Search ............. 355/75, 76, 3 SH, 3 SC; 271/195, 236, 245, DIG. 2

[56] References Cited

U.S. PATENT DOCUMENTS

| | | | |
|---|---|---|---|
| 3,087,402 | 4/1963 | Hamlin | 355/78 |
| 3,224,761 | 12/1965 | Meyer-Jagenberg | 271/195 |
| 3,804,401 | 4/1974 | Strange | 271/195 X |
| 3,888,585 | 6/1975 | Cross | 355/75 |
| 3,937,571 | 2/1976 | Krulik et al. | 355/3 SC |
| 3,984,098 | 10/1976 | Stange et al. | 271/236 |
| 4,033,694 | 7/1977 | Ferrari | 355/76 |

*Primary Examiner*—Donald A. Griffin

[57] ABSTRACT

A reproducing apparatus and process including apparatus for discharging an original from an exposure station after exposure. The original is fed over a fixed stop surface after its lead edge is lifted by an air flow directed against it.

5 Claims, 3 Drawing Figures

ORIGINAL HANDLING SYSTEM AND PROCESS

BACKGROUND OF THE INVENTION

This invention relates to an original handling system for discharging an original from an exposure station of a copying machine such as a xerographic reproducing apparatus.

Various document or original handling devices are known in the art. In U.S. Pat. No. 3,888,582 to Griswold, feed rolls are utilized to discharge an original document from an exposure station of a xerographic copier.

It is also known to employ belt-type document handling systems for moving documents on and off a stationary viewing platen. One system which is particularly advantageous for such a purpose is described in U.S. application Ser. No. 632,426, filed Nov. 17, 1975, now U.S. Pat. No. 4,033,694 to Ferrari. In Ferrari, the document handling belt which overlies the viewing platen comprises a vacuum transport. When the document is to be discharged from a vacuum transport and off of the platen, the discharging side of the transport is pivoted away from the platen to help lift the document over a stationary manual registration edge. Air jets are provided for applying an air flow against the document as it is stripped from the vacuum transport for counteracting the air flow from the vacuum transport. Other types of belt arrangements for advancing documents on and off a platen are also known as, for example, that described in U.S. Pat. No. 3,674,363 to Baller et al.

It is also known in the art as exemplified by U.S. Pat. Nos. 3,224,761 to Meyer-Jagenberg; 3,336,028 to Schonmeier; and 3,502,407 to Granzow et al. to utilize an air flow arrangement positioned at the exit point of a sheet conveyor for the purpose of supporting the lead edge of the sheet and for providing an air cushion to facilitate the complete exit of the fed sheet.

Air flows have also been utilized to advance documents onto a viewing platen and into registration with a fixed stop. After completion of the exposure operation, the stop is withdrawn from engagement with the document and the document is fed by means of an air flow from the platen. Such an approach is disclosed, for example, in U.S. Patent application, Ser. No. 627,570 filed Oct. 31, 1975, to Stange et al. It is also known in systems of the type wherein air flows are utilized to advance documents into registration to provide ports in a fixed registration edge and to provide reversible air flows through the ports which can advance a document in one direction against the registration edge and in the opposing direction away from the registration edge. Such an approach is described in U.S. application Ser. No. 627, 571, filed Oct. 31, 1975 to Stange, now abandoned, and refiled as U.S. application Ser. No. 775,508, filed Mar. 8, 1977.

In conventional document handling systems wherein a document is advanced into engagement with a registration stop which is then removed prior to the document being ejected, difficulties can arise in that the document will attempt to get under the registration stop or otherwise jam into the registration stop. This is a particular problem when the registration stop is selectively movable against an edge of the viewing platen between operative and inoperative positions. It is difficult to maintain the stop in intimate contact with the entire edge of the platen in order to prevent documents from wedging between the stop and the platen edge.

SUMMARY OF THE INVENTION

In accordance with the present invention, a fixed register stop is employed. The engagement between a fixed register stop and its adjacent surface can be sufficiently intimate to prevent a document from being wedged between the two. When a fixed register stop is employed, however, there is a difficulty in feeding the document over the registration stop because of the engagement between the lead edge of the document and the stop surface.

In accordance with this invention, this problem is overcome by providing a fluid flow such as an air flow through ports in the register stop. The purpose of the air flow is to lift the lead edge of the original. As the lead edge of the original is lifted by the air flow, which is directed counter to the direction in which the original is to move, the original is fed from the viewing platen by a conventional document feeding system.

Accordingly, it is an object of this invention to provide an improved handling apparatus and process.

It is a further object of this invention to provide an apparatus and process as above, which includes a mechanism for assisting the discharge of an original from an exposure station having a fixed register stop.

DETAILED DESCRIPTION OF THE PREFERRED EMBODIMENTS

This invention relates to a mechanism for assisting an apparatus which serves to discharge an original from an exposure station in a reproducing machine, particularly a xerograhpic reproducing apparatus.

Figure 1:
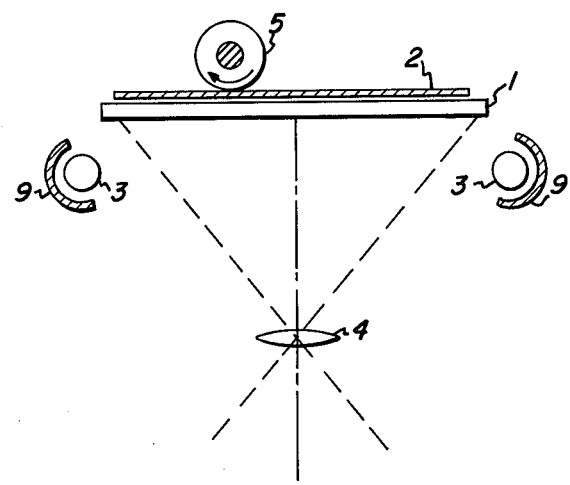
FIG. 1 is a side view showing the relationship between an original discharging roller and an exposure platen glass.

FIG. 1 shows the construction of a conventional original discharging mechanism. An exposure platen glass 1 has an original 2 placed upon it. The original 2 is irradiated by exposure lamps 3 to form an image which is projected onto a photosensitive body (not shown) by means of lens 4. A feed roller 5 is arranged to selectively rotate in the direction as indicated by the arrow. The feed roller 5 engages the backside of the original 2 to discharge it off of the exposure platen glass 1 after the desired exposure has been completed.

Figure 2:
FIG. 2 is a side view showing an original position registration member provided on the exposure platen glass.

Referring to FIG. 2, a platen registration member 6 is provided on the exposure platen glass 1 for registering or determining the position of the original on the platen. The registration member 6, protrudes from the exposure platen glass surface and, therefore, provides an obstacle to the discharge of an original in the direction which would move it over the registration member 6.

Figure 3:
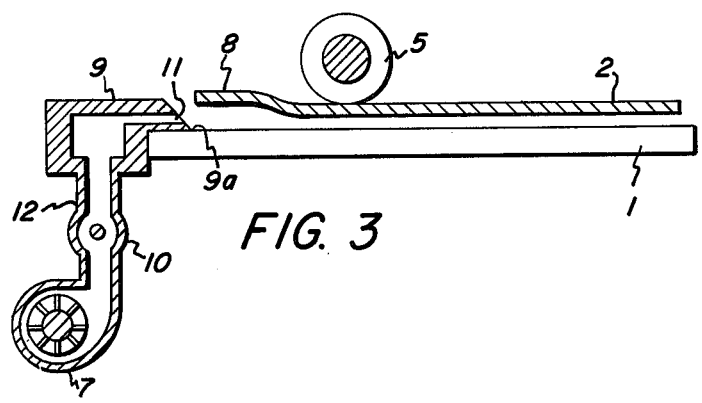
FIG. 3 is a partial cross-sectional view of an original discharge device in accordance with the present invention.

In accordance with the present invention, as shown in FIG. 3, a row of air injection ports 11 are provided. The ports are located in the stop surface 9a of the original registration member 9. A plurality of ports 11 are employed along the full length of the exposure glass platen. An air flow through the ports 11 is provided by a blower 7 after the exposure has been completed. The air flow is directed in general opposition to the direction in which the original is to move. This causes an air layer to form between the original 2 and the exposure platen glass 1 thereby lifting the lead edge of the original as shown. Under this condition, when the feed roller 5 is rotated in the direction as indicated by the arrow in FIG. 1, the original is easily discharged from the exposure platen glass and fed over the fixed registration member 9.

In the embodiment shown, a valve 10 is provided in the conduit 12 between the blower 7 and the registration member 9. The valve 10 is adapted to be closed during exposure to cut-off any air flow at that time. It is selectively opened after exposure in order to lift the lead edge of the original to permit its being fed over the registration member 9.

Since the lead edge of the original is lifted, as it is discharged, damage to the lead edge can be substantially reduced using the apparatus of this invention. In a conventional apparatus, it is difficult to discharge the original due to the electrostatic charge on the exposure glass. However, with the device according to this invention, the edge of the original which is lifted releases the seal between the exposure glass and the original due to the charge, thereby making it easy to discharge the original from the glass.

While the apparatus of this invention is particularly adapted for use in conjunction with a roll-type document advancing mechanism 5, it could also be employed with a conventional belt-type document transport. If a belt-type transport were used, it would be desirable to lift the end of the belt adjacent the register stop in the manner of the aforenoted Ferrari application to provide sufficient room for the lead edge of the original to be lifted up by the air flow in accordance with this invention.

The patents, patent applications, and texts specifically set forth in this application are intended to be incorporated by reference into the description.

Therefore, it is apparent that there has been provided in accordance with this invention an original handling system and process for a copying apparatus which fully satisfies the objects, aims, and advantages set forth hereinbefore. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. In a reproducing apparatus comprising:
means for discharging an original from an exposure station after exposure; said exposure station comprising: an exposure platen; fixed stop means having a stop surface for engaging an edge of said original for determining the position of said original on said exposure platen; and means for projecting an image of said original at said platen onto a photosensitive body; said discharging means including means for feeding said original in a desired direction off said platen and over said fixed stop means; the improvement, wherein, said apparatus further includes:
means for flowing air against said edge of said original and across said platen in a direction opposed to said desired direction in which said original is fed off said platen, said means for flowing air forming an air layer between said exposure platen and said original for lifting said edge of said original so that it can be discharged over said fixed stop means.

2. An apparatus as in claim 1, wherein said means for flowing air comprises at least one port arranged in said stop surface of said fixed stop means to direct said air flow against said edge of said original and means for providing a flow of air through said at least one port.

3. An apparatus as in claim 2, wherein a plurality of said ports are provided in said stop surface, said ports being arranged along said exposure platen, and wherein said fixed stop means intimately engages said exposure platen.

4. An apparatus as in claim 3, wherein said feeding means comprises a roll.

5. An apparatus as in claim 3, wherein said means for providing said air flow through said ports comprises a blower and further including selectively operable valve means for stopping said flow of air during exposure of said original.

* * * * *